United States Patent [19]
Moulds

[11] 4,162,275
[45] Jul. 24, 1979

[54] FLAME-RESISTANT FIBER

[75] Inventor: Gordon M. Moulds, Waynesboro, Va.

[73] Assignee: E. I. Du Pont de Nemours and Company, Wilmington, Del.

[21] Appl. No.: 807,736

[22] Filed: Jun. 17, 1977

Related U.S. Application Data

[63] Continuation-in-part of Ser. No. 383,038, Jul. 26, 1973, abandoned.

[51] Int. Cl.[2] .......... C08L 61/10; C08L 61/28; C08L 77/10; D01F 11/08

[52] U.S. Cl. .......... 525/428; 260/45.7 P; 525/429

[58] Field of Search .......... 260/849, 841

[56] References Cited

U.S. PATENT DOCUMENTS

| | | | |
|---|---|---|---|
| 2,772,188 | 11/1956 | Reeves | 427/342 |
| 3,681,124 | 6/1972 | Sello et al | 428/272 |

FOREIGN PATENT DOCUMENTS

| | | | |
|---|---|---|---|
| 871581 | 9/1961 | United Kingdom | 260/849 |
| 1169194 | 10/1969 | United Kingdom | 260/849 |

*Primary Examiner*—John C. Bleutge

[57] ABSTRACT

A fiber comprising poly(metaphenylene isophthalamide) containing distributed substantially throughout its whole interior finely divided cross-linked, phosphorus-containing resin deposits in an amount sufficient to provide at least 0.4% by weight of phosphorus, based on total weight of fiber. Fabrics of the fiber, as well as the fiber itself, have good flame resistance properties.

6 Claims, No Drawings

FLAME-RESISTANT FIBER

CROSS-REFERENCE TO RELATED APPLICATION

This application is a continuation-in-part of U.S. patent application Ser. No. 383,038, filed July 26, 1973 now abandoned.

FIELD OF THE INVENTION

This invention relates to synthetic textile fibers of improved flame resistance. More particularly, the invention is directed to textile fibers of poly(metaphenylene isophthalamide) containing distributed therein finely divided deposits of a phosphorus compound cross-linked to a reactive resin.

BACKGROUND

The search for improved flame-resistant textile fibers suitable for use in clothing, upholstery, draperies, etc. has extended over many years. Among the techniques proposed in the art for preparing such fibers is one which involves coating individual fibers or yarns with various resins and/or flameproofing agents, or impregnating (padding) such compounds onto existing fabrics. Although various degrees of success have been achieved with regard to improved flame resistance, such products often have lost their "textile" characteristics and invariably suffer from a harsh, boardy, unpleasant, tactile hand, as well as poor durability of flame resistance through subsequent loss of the flameproofing agent by a surface abrasion through wear and/or repeated laundering of the fabric. With the advent of manmade fibers, it became possible to spin-in certain flameproofing agents, though not without manufacturing complications plus degradation in fiber tensile properties. Very recent technology has provided improved fibers from inherently less flammable synthetic aromatic polymers, e.g., those constructed from aromatic carbocyclic and heterocyclic links. The good flame-resistant performance of such fibers has been further enhanced by post-formation treatments such as controlled partial oxidation, sulfuration, halogenation and metalization. However, such treatments frequently deleteriously affect the tensile properties of the fibers, the treatments are difficult to control and are time-consuming and uneconomical, and the treated products (and even certain of the untreated, aromatic polymer fibers themselves) are inherently and undesirably highly colored, thus severely limiting their utility for many consumer applications.

SUMMARY

The present invention provides novel textile fibers, e.g., continuous filaments, staple or tow, and other structures, such as yarn and fabric made therefrom, which are useful for clothing and furnishings of improved flame-resistant qualities. These textile fibers, made of poly(metaphenylene isophthalamide), contain distributed substantially throughout their whole interior finely divided deposits of a phosphorous compound cross-linked to a reactive resin.

DESCRIPTION OF THE INVENTION

Fabrics of these fibers possess good strength and aesthetic properties in addition to improved response to severe flame exposure, which features are durable through extended wear and repeated laundering or dry cleaning. These fabrics exhibit high values of L.O.I. (limiting oxygen index), substantially increased time for hole burn-through, decreased burn shrinkage, no afterburning on removal from flame source, and decreased heat transmission through the fabric exposed to the flame source. Such characteristics are all highly desirable and are particularly important in the case of protective garments, e.g., for aircraft personnel, firemen, workers who handle flammable gases and liquids, hospital patients, etc. The much greater times for hole burn-through (F.I.T. test) for these fabrics are particularly surprising, since comparable fabrics prepared from fibers of the same polymer impregnated by prior art methods with comparable quantities of the same phosphorus-containing resins exhibit no or only modest increases in F.I.T., and these only at the expense of severe degradation of tactile aesthetics.

The fibers of this invention may be prepared by extruding a solution of poly(methaphenylene isophthalamide) (MPD-I), e.g., as prepared according to U.S. Pat. No. 3,063,966, in a solvent comprised essentially of dimethylacetamide (DMAc) plus an ionized salt through a multi-hole spinneret into a heated vertical cell, e.g., as described in U.S. Pat. No. 3,360,598. Most of the DMAc is evaporated as the fibers pass through the heated cell, and the filaments emerging from the bottom of the cell are flooded and quenched with an aqueous liquid. These water-swollen fibers are further extracted and drawn while being passed through a multi-tank apparatus containing heated aqueous baths, e.g., as described in U.S. Pat. No. 3,725,523. At this point, the never-dried, water-swollen fibers (approximately 1:1 ratio of polymer to water) are immersed in an aqueous solution of a phosphorus compound, a reactive resin compound, and optionally a catalyst, whereupon the solute concentrations inside and outside the swollen fiber become equilibrated, as governed by concentration gradients, electrostatic effects, molecular interactions, etc. The resulting solute-containing fiber is subsequently removed from the bath, dried, and heat-cured, thereby generating finely divided cross-linked phosphorus-containing resin deposits in situ throughout substantially the whole fiber interior.

Suitable phosphorus compounds are preferably both water soluble and sufficiently reactive that they may subsequently be cross-linked and insolubilized inside the fiber by a simple heat treatment. Preferred compounds are tetrakis hydroxymethyl phosphonium compounds, e.g., the chloride (THPC) or oxalate (THPOX). Suitable resin components are also preferably both water soluble and reactive with the phosphorus compounds at elevated temperature to form a cross-linked, insoluble product. The reaction rate at ambient temperatures should be as low as possible to provide maximum treatment-solution-lifetimes. Preferred resin components are condensates of melamine formaldehyde (e.g., Aerotex UM from American Cyanamide Co.), phenol-formaldehyde and hexamethylol melamine. These components may optionally be combined with other reactive materials such as guanidine phosphate. (Less preferred phosphorus compounds and resin components which are soluble only in water-miscible solvents are also operable by using treating solutions based on the appropriate solvent.) A catalyst, e.g., ammonium chloride or magnesium chloride, which facilitates the reaction between the phosphorus compound and resin component at elevated temperature, e.g., 170° C. for 15 minutes may optionally also be included. For the purpose of the present invention, sufficient reaction has occured when the phosphorus/resin deposits have become insoluble in DMAc containing 4% LiCl, a solvent for the MPD-I fibers. (In some instances, the entire fiber plus deposits will become insoluble in this solvent.) Such deposits are referred to herein as "cross-linked," and they will obviously have been rendered too insoluble to be extracted from the fibers by even repetitive, aqueous laundry or dry-cleaning treatments.

Although similar phosphorus/resin systems have been employed in the prior art for flameproofing fibrous materials, several distinctions characterize the present novel products. First, the present MPD-I fibers themselves are inherently more flame-resistant than the fibers treated in the prior art, e.g., cotton, wool, rayon, etc., so that substantially lower levels of flame retardant add-on are effective, e.g., 5% or even less vs. about 30% commonly employed for cotton, and about 10–12% for wool. Secondly, the prior art recipes generally employ a mixture high in resin content, e.g., one part phosphorus compound to 2 parts resin, since a preponderance of binder (or resin) is necessary in order to durably adhere the phosphorus compound to the surface of the fibers. In contrast, the preferred proportions of components are reversed for the present invention, e.g., 2–4 parts of phosphorus compound to one part resin, since only sufficient resin need be available to cross-link and insolubilize the phosphorus compound-adhesion being of little concern since the flame retardant deposits in the present structures are situated inside the fibers. Accordingly, any given phosphorus level desired may be attained for the present fibers with a much smaller total phosphorus/resin add-on. The amount of phosphorus present will be such as to provide at least 0.4% by weight of phosphorus, based on total fiber weight. The most preferred fibers contain 0.7 to 2.1% by weight of phosphorus. Furthermore, as a consequence of the smaller quantities required and the internal locaton of the flame retardant of the present invention, fiber tensile properties suffer little or no degradation, the tactile aesthetics of the treated fibers and fabric thereof are substantially unaltered, and the flame-resistant properties are substantially more durable to wear abrasion and washing/dry cleaning.

F.I.T. times and L.O.I. values, both important flame resistance parameters, are apparently dependent primarily on the phosphorus content, and it has been discovered that in the case of the fibers of the present invention both parameters begin to show significant increases as the phosphorus content reises above a threshold value of about 0.4 weight %. Both parameters have almost "leveled off" at a high "plateau" when the phosphorus content has been increased to about 3 weight %. The most preferred range of phosphorus is from 0.7% to 2.1%, the latter value corresponding to the approximate level at which the MPD-I fibers are "filled" with phosphorus/resin so that further increments in phosphorus content are deposited primarily at/or on the surface of the fibers.

A characteristic and essential feature of the fibers of the present invention is that the cross-linked phosphorus/resin deposits are distributed substantially throughout the whole interior of the MPD-I fibers. This feature may be demonstrated employing the following X-ray microprobe technique. A convenient number of parallel filaments is imbedded in a conventional epoxy matrix, and subsequently cut perpendicular to the fiber axes to expose smooth cross-sectional fiber surfaces. This sample is mounted for examination of the exposed cut surface in any scanning electron microscope, e.g., a Mark I Stereoscan Electron Scanning Microscope from Kent Cambridge Scientific, Inc., 8020 Austin Avenue, Morton Grove, Ill. An individual fiber cross-section in the field is selected for analysis, scanning is terminated, and the electron beam directed at specific target locations in the fiber cross-section. The beam irradiates a spot approximately 150 Å in diameter, producing an excited region estimated to be approximately 0.05 micron in diameter. X-rays emitted from phosphorus atoms in this region are detected with an energy dispersive detector attachment, e.g., a Model 707 Analyzer and a Nova 1210 Computer Data Reduction System available from EDAX International, P.O. Box 135, Praire Veiw, Ill. The number of counts detected in a 100 second interval is recorded for each such location studied. For the purposes of the present invention, the phosphorus/resin is considered to be distributed "substantially throughout the whole interior of the fibers" when the number of counts detected for a region at the center of the fiber cross-section is at least 50% as large as the number of counts detected at a second region location within about 0.1 micron of the fiber surface. This test therefore distinguishes the fibers of the present invention from those fibers wherein a substantial fraction of the phosphorus/resin flame retardant component has not penetrated to the core of the fiber. High magnification electron transmission microscopy of thin cross-sections of fibers of the present invention fails to resolve individual phosphorus/resin deposits in the interior of the fibers, although the X-ray microprobe test substantiates that phosphorus is present in the fiber interior. Accordingly, the phosphorus/resin deposits are referred to as "finely divided," and the maximum dimensions of individual deposits is thought to be less than about 50 Å in size.

The flame resistant fibers of the present invention have no inherent color of their own either from the MPD-I polymer itself or from the cross-linked phosphorus-containing resin deposits. Accordingly, they may be tinted to provide almost any shade desired for various textile applications either by incorporating coloring agents (e.g., pigments) in the solutions from which the fibers are initially dry-spun, or by absorbing a dye into the fibers concurrently with the phosphorus/resin absorption step, or by post-formation dyeing of the treated fibers employing techniques appropriate for dyeing aromatic polyamide fibers. The fibers may also contain other agents such as UV screeners, bacteriostats, etc.

Fabric Integrity Test (F.I.T.)

This test measures the ability of a fabric to resist break-open on exposure to flame.

A Fisher burner whose air control sleeve has been removed is connected to a source of butane gas via a flow meter. Butane is supplied at a flow rate equivalent to 1750 cc per minute of air at STP (one atmosphere, 70° F.). A 4"×4" brass plate having a 2"×2" centrally located aperture is positioned horizontally at a distance of 4 cm above the burner top. Mechanical stops are provided such that the lighted burner may rapidly be moved into position directly beneath the aperture to commence a test. A swatch of the test fabric is held taut across the aperture by four spring clamps positioned along each edge of the brass plate. When the burner is moved into position, an observer with a stop watch determines the time interval required for the heat flux to cause a hole to form in the fabric and expose the flame. ("Hole" means any aperture, ranging all the way from catastrophic break-open of the fabric down to even pinhole size.)

For F.I.T. values from 0-60 seconds, the higher the F.I.T. value, the greater is the flame protection provided 60 seconds and above are considered approximately equally "excellent," since reproducibility at such long times becomes somewhat erratic.

Fabric Shrinkage Test

A 2"×10.0" strip of the test fabric is placed across the aperture in the brass plate, clamped at one end only, with the remainder of the strip lying freely extended across the plate and its associated mechanical supports. The fabric is exposed to the flame for eight seconds during which period the unclamped portion is allowed to be "drawn up" into the aperture area by any thermally-induced shrinkage. Following the exposure, the final length $L_f$ of the fabric is measured (in inches), as is $L_b$ which is the length of the burned/exposed section. % shrinkage is computed from $$\% \text{ shrinkage} = \frac{(10.0 - L_f)}{(10.0 - L_f) + L_b} \times 100$$

% shrinkage for the fabric is reported as the arithematical average of the values determined for three test strips.

Limiting Oxygen Index (L.O.I.)

The L.O.I, is the minimum fraction of oxygen in an oxygen/nitrogen mixture required to just support burning of the sample, see Fenimore & Martin, *Modern Plastics,* Volume 44 (3), 141 (1966).

Stock Tow Preparation

Fibers are prepared from a filtered solution consisting of 18.5%, based on the weight of the solution, of poly(-metaphenylene isophthalamide) in N,N-dimethylacetamide DMAc that contains 45% calcium chloride based on the weight of the polymer. The polymer has an inherent viscosity of 1.60 as measured on a 0.5% solution in DMAc/4% LiCl at 25° C. The spinning solution is heated to 133°-140° C. and extruded at 0.57 g/min/-hole through multi-hole spinnerets, each hole 0.006 inch (150 microns) in diameter and 0.012 inch (300 microns) long, into heated spinning cells. Each cell has five heated zones with temperatures from top to bottom of 320°, 300°, 250°, 200° and 160° C., and a flow of 395° C. inert gas at about 3.67 pounds/hr. (1.67 kgm/hr.). The fibers are converged at a guide at the bottom of each cell where they are flooded with an aqueous solution containing 7-10% DMAc and 5-7% $CaCl_2$. Fibers from several adjacent cells are combined to give a large bundle of fibers, referred to as a "tow," each filament being about 12 dpf as spun.

The wet tow Vis fed at 78 ypm (71 meters/min) to be extracted and drawn in aqueous baths contained in a ten-tank apparatus. Total draw ratio is 4.2×, and individual bath concentrations, temperatures and draw ratios are shown on Table A. Finish is applied to the two and the fibers are crimped in a steam stuffer-box crimper. The crimped, never-dried fibers are stored wet in a sealed container.

TABLE A

| | WASH DRAW MACHINE SETTINGS | | | |
|---|---|---|---|---|
| Tank No. | Draw Ratio (X) | % DMAC | % $CaCl_2$ | Temp., °C. |
| 1 | 2.55 | 28 | 9 | 82 |
| 2 | 1.41 | 28 | 9 | 82 |
| 3 | 1.13 | 20 | 7 | 82 |
| 4 | 1.01 | 15 | 5 | 90 |
| 5 | 1.01 | 10 | 3 | 90 |
| 6 | 1.01 | — | — | 90 |
| 7 | 1.01 | — | — | 95 |
| 8 | 1.01 | — | — | 95 |
| 9 | 1.01 | — | — | 95 |
| 10 | 1.01 | — | — | 98 |

In the following Examples, all proportions are percentages by weight and parts by weight, unless otherwise specified.

EXAMPLE I

A portion of the stock, never-dried tow is equilibrated for 60 minutes at 30° C. with 100 parts of an aqueous solution containing 7 parts THPC (tetrakis hydroxymethyl phosphonium chloride from Hooker Chemical Co.) and 3 parts melamine-formaldehyde resin (Aerotex UM form American Cyanamide) and 0.08 parts magnesium chloride hexahydrate per 20 parts of fiber (dry weight basis) adjusted to pH4 with 10% phosphoric acid. The treated tow is removed from the bath, dried and heated for 15 minutes in an oven at a temperature of 170° C. to cross-link and cure the phosphorus/resin. The tow is cut to 1.5 in. (3.75 cm.) staple, spun to a 27.8Z twist, 37 c.c. singles yarn, and woven into a 2×2 twill (112×78) fabric. This sample is identified as fabric 1A.

A second fabric, 1B, is prepared as above, except that 33 parts (dry weight basis) of the never-dried stock tow is employed.

A third (reference) fabric 1C is prepared from tow which has received no THPC/resin treatment.

These three fabrics are tested for F.I.T. and flame shrinkage, with results as reported in Table I. Note the extraordinary improvement in F.I.T. values, as well as the reduced flame shrinkage, for samples 1A and 1B made from fibers of the present invention as compared to fabric 1C made from untreated MPD-I fibers. (Fabric 1C is, of course, already remarkably good in its high temperature flame resistance performance as compared to, e.g., cotton or wool fabrics.)

TABLE I

| FABRIC | F. I. T. (Sec.) | SHRINKAGE (%) (8 sec. exp.) |
|---|---|---|
| 1-A | 170 | 30.7 |
| 1-B | 145 | 37 |
| 1-C | 2 | 48 |

EXAMPLE II

Portions of the stock, never-dried tow are treated in a manner similar to Example I employing other ratios of phosphorus to fiber to produce the fiber samples listed in Table II. Cross-sections of these samples are studied with the microprobe technique with the observed number of counts as reported in Table II. Fibers of the present invention (Samples 2A and 2B) are seen to have at least as high a phosphorus concentration in their center region as at their edge. These cross-linked, phosphorus/resin deposits in the fiber are too small to be resolved in electron transmission microscope studies of fiber cross-sections, and are insoluble in DMAc containing 4% LiCl.

In similar experiments in which fibers of progressively increasing phosphorus contents are prepared, it is observed that when the phosphorus content rises above about 2.1%, subsequent phosphorus/resin increments appear to be deposited primarily on the fiber surface. Such surface deposits become detectable in electron microscope cross-section studies, and cross-linked, phosphorus/resin particles recovered from such samples by dissolving away the MPD-I fiber exhibit concave cylindrical surfaces apparently formed at a fiber/-deposit interface. Furthermore, it is observed that the ease of dyeing of phosphorus/resin-treated fibers rapidly decreases with increasing phosphorus content up to about 2.3% phosphorus, after which dyeability remains essentially consistent. From these observations it is concluded that the stock, never-dried MPD-I fibers become "filled" with phosphorus/resin when the phosphorus content reaches approximately 2.1%. It is possible, of course, that alterations in the fiber dry-spinning recipe (variations in temperature, concentration, solvent, etc.) and extraction-drawing conditions could lead to stock fibers with somewhat larger (or smaller) capacity for phosphorus/resin. However, 2.1% phosphorus is (chemically) already more than sufficient, in the case of MPD-I base fibers, for most flame-resistant fiber purposes.

TABLE II

| | | COUNTS PER 100 SECONDS | | |
|---|---|---|---|---|
| FIBER | % P | CENTER | EDGE | MATRIX |
| 2-A | | | | |
| sec. 1 | 2.1 | 1165 | 1141 | 0 |
| sec. 2 | | 1464 | 1062 | 0 |
| 2-B | 0.6 | 472 | 182 | 0 |
| 2-C | 0 | 0 | 0 | 0 |

EXAMPLE III

Another fiber sample according to the present invention is prepared by equilibrating 200 parts (dry weight basis) of the stock, never-dried tow with 4000 parts of an aqueous solution containing 80 parts THPC, 20 parts Aerotex UM resin and 0.8 parts ammonium chloride at 80° C. for ½ hour. Excess solution is squeezed from the tow which is then cured for 15 minutes at 170° C. to yield an MPD-I fiber containing finely divided cross-linked phosphorus/resin deposits with a 0.56 phosphorus analysis. Fabric prepared from these fibers, as in Example I, is identified as Sample 3A. A portion of this fabric is subsequently autoclaved in 68 psig steam for 15 minutes, and is identified as Sample 3B. A similar fabric is prepared from MPD-I fibers having no phosphorus/resin treatment, and identified as Sample 3C. Test results are given in Table III. Note that fabrics 3A and 3B of this invention, as compared to reference fabric 3C, desirably have enormously improved (higher) F.I.T., lower shrinkage, and higher L.O.I. Fabrics 3A and 3B also exhibit lower heat transfer, and substantially shorter after-flame on separation from the ignition source.

TABLE III

| FABRIC | % P | F.I.T. (sec) | SHRINKAGE (%) | L.O.I. |
|---|---|---|---|---|
| 3-A | 0.56 | 60 | 47 | — |
| 3-B | 0.56 | 83 | 38 | 0.46 |
| 3-C | 0 | 2 | 50 | 0.28 |

EXAMPLE IV

Samples are prepared using prior art padding-on ("impregnating") techniques in an attempt to duplicate the highly desirable and surprising large increases in F.I.T. values observed for fabrics prepared from fibers of the present invention.

A fabric of similar construction to fabrics 1C and 3C is treated by applying to portions of the dry fabric aqueous pastes of various compositions as indicated in Table IV.

TABLE IV

| FABRIC | PASTE COMPOSITION | | % P IN FABRIC | L.O.I. | F.I.T. (sec) |
|---|---|---|---|---|---|
| 4-A | none | | 0 | 0.28 | 2 |
| 4-B | 10% | THPC | 0.14 | 0.26 | 2.4 |
| 4-C | 2.5% | Aerotex UM | 0.01 | 0.28 | 2.7 |
| 4-D | 12.5% | THPC//Aerotex UM (80//20) | 0.88 | — | 4.8 |
| 4-E | 50% | " | 1.18 | 0.42 | 3.6 |
| 4-F | 12.5% | " | 1.37 | 0.38 | 2.9 |
| 4-G* | 12.5% | " | 2.6 | 0.39 | 17.0 |

*Very boardy fabric

The treated samples are dried and then cured for 5 minutes at 170° C. Values of L.O.I. and F.I.T. for these samples are given in Table IV. Note, particularly from samples 4D through 4G, that while it is possible to apply substantial quantities of phosphorus by this prior art technique (and that values for L.O.I. are thereby increased, as would be anticipated), no significant increase in F.I.T. is observed except for sample 4G, and then only a modest increase in spite of its relatively high phosphorus content. Even this modest increase in F.I.T. for sample 4G is achieved only at the expense of an unacceptable degradation in tactile aesthetics (fabric 4G is very boardy), inspite of the fact that only a minimum quantity of resin (Aerotex UM) is employed, which would need to be substantially increased (thereby further aggravating the boardiness problem) to insure even minimum durability for such large amounts of padded-on phosphorus.

Another sample similar to fabrics 4D through 4G is prepared with a 1.0% phosphorus add-on. Fibers from this fabric are examined by the X-ray microprobe technique with results as indicated in Table IV-A. Each of the five filaments studied for this sample exhibits at most only a trace of phosphorus at its center, and none, therefore, has its phosphorus/resin distributed "substantially throughout its whole interior," as required for fibers of the present invention, even though the total phosphorus present (1%) would otherwise meet the requirements. Although not shown explicitly in Table IV-A, it is observed in making these measurements that the number of counts per 100 seconds at the fiber surface varies erratically at various points around a given filament's circumference, reflecting the capricious, non-uniform distribution of the surface phosphorus/resin coating

TABLE IV-A

| MPD-I FIBERS WITH PADDED-ON THPC/AEROTEX UM (1% PHOSPHORUS) | | | |
|---|---|---|---|
| CROSS-SECTION | COUNTS PER 100 SECONDS CENTER | EDGE | MATRIX |
| #1 | 56 | 924 | 0 |
| 2 | 0 | 895 | 0 |
| 3 | 0 | 746 | 0 |
| 4 | 58 | 2126 | 0 |
| 5 | 0 | 964 | 0 |
| AVERAGE | 23 | 1131 | |

It is conjectured that the higher values of L.O.I. observed for samples of the present invention as well as these samples of Example IV prepared by prior art methods is simply a chemical consequence dependent on the quantity of phosphorus flame retardant available. On the contrary, the gross difference in F.I.T. performances for fabrics of the present invention contrasted to the Example IV fabrics is perhaps a mechanical reinforcement effect produced by the internal location of the cross-linked phosphorus/resin deposits unique to the fibers of the present invention.

EXAMPLE V

Several fabric samples are prepared employing the technique of Example I to determine the optimum phosphorus compound/resin ratio. 200 Parts (dry weight basis) of the stock, never-dried tow are equilibrated with 4000 parts of an aqueous solution at 80° C. for 30 minutes, the treated tow removed and squeezed free of excess solution, and dried and cured at 170° C. for 15 minutes. Fabrics made from such samples are tested for flame-resistant performance as indicated in Table V. From these and similar data, it is concluded that the optimum ratio of THPC to Aerotex UM is in the range of about 2:1 to 4:1 for fibers of the present invention.

TABLE V

| FABRIC | TREATMENT SOLUTION PARTS THPC//PARTS AEROTEX UM | % P | F.I.T. (sec) | SHRINKAGE (%) (8 sec exp) |
|---|---|---|---|---|
| 5-A | 100//0 | 0.19 | 2.3 | 46 |
| 5-B | 90//10 | 0.42 | 2.7 | 45 |
| 5-C | 80//20 | 0.43 | 52 | 47 |
| 5-D | 70//30 | 0.47 | 137 | 46 |

EXAMPLE VI 63 lbs. (28.7 kgs) [35 lbs. (15.8 kgs) on a dry weight basis] of the wet, never-dried tow is piddled into a stock dryer and 144 liters of cold water added. A solution of 18.6 lbs. (8.4 kgs) THPC in 7.54 liters of water is added and the bath circulated through the tow for five minutes. A solution of 4.65 lbs. (2.1 kgs) Aerotex UM in 7.54 liters of water is added and circulation continued for another five minutes at which point 0.10 lbs. (0.5 kgs) of ammonium chloride in 3.78 liters of water is added along with sufficient phosphoric acid to adjust the pH to 4.0±.2. (Sequential addition of THPC, resin, and catalyst solutions minimizes stability/short lifetime problems frequently encountered when multi-component, single solutions are used instead.) After five more minutes circulation, a dye solution of 19 liters water containing 235 grams Astrazon ® Olive Green BL, 44 grams Basacryl ® Red GL, and 146 grams Basacryl ® Yellow 5RL is added, the temperature raised to 176° F. (80° C.) at 2° F. per minute (1.1° C. per minute) and held for 60 minutes. The solution and tow are allowed to cool, and the solution then drained. The tow is autoclaved for one hour in 40 psig (2.8 kg/cm$^2$) steam to cure the phosphorus/resin deposits. Then 189 liters of water is added, plus a scouring solution comprising 159 grams Duponol C plus 635 grams sodium carbonate in 8 liters of water. The temperature is raised to 212° F. (100° C.) and held for 20 minutes. The bath is drained and the tow rinsed with water. Another 189 liters of water is added plus an acid scour comprising 400 ml of 20% acetic acid, the temperature is raised to 160° F. (71° C.) and held for 20 minutes. The bath is drained and the tow rinsed well with water. The fibers have thereby been colored sage green, and their phosphorus content is 1.0% in the form of finely divided cross-linked phosphorus-containing resin deposits distributed substantially throughout the whole interior of the MPD-I fibers.

EXAMPLE VII

In a comparative experiment, a quantity of wet, crimped, never-dried MPD-I fiber tow is divided into two equal parts, part 7-A is retained as "wet never-dried" tow, and part 7-B is dried in a tow drier with the three zones at 150°, 160°, and 200° C.

A treating solution is prepared as follows: 1600 g. of 80% aqueous THPC is neutralized to pH 7.5 using 50% NaOH. This is mixed with a solution of 400 g. of melamine-formaldehyde resin (Resloom H.P. from Monsanto), 468 g. water and 0.32 g. $MgCl_2 \cdot 6H_2O$. The resulting treating solution is placed in the trough of a two roll padder (Geigy-Ilma dye padder) and tows 7-A and 7-B are fed side-by-side through the padder at 0.66 ft./min. The samples are held in closed containers for 12 hours to permit equilibrium penetration, and then rinsed with water containing 0.5% Duponol C (b.o.f.) for 10 minutes at room temperature. The twos are dried and heat-treated at 170° C. for 15 minutes in a tray dryer, and then scoured at 80° C. for 10 minutes in water containing 0.5% Duponol C (b.o.f.), and dried. At this stage samples 7-A and 7-B contain 1.02% and 0.21% phosphorus, respectively.

Tows 7-A and 7-B are each cut to 1.5" staple, along with a dry untreated control, sample 7-C. Portions of these three staple samples are submitted for X-Ray microprobe study, with results as reported in Table VI-A (ten individual cross-sections for each sample).

TABLE VI-A

| SAMPLE | | Counts Per 100 Seconds CENTER | | SURFACE | |
|---|---|---|---|---|---|
| 7-A | (Wet, Treated) | 1136 | 1616 | 1078 | 474 |
| | | 772 | 1777 | 618 | 1310 |
| | | 612 | 1854 | 485 | 1142 |
| | | 1004 | 1411 | 850 | 1248 |
| | | 503 | 656 | 593 | 470 |
| | Average | | 1134 | | 826 |
| | Std. Dev. | | 504 | | 340 |
| 7-B | (Dry, Treated) | 0 | 0 | 320 | 0 |
| | | 0 | 0 | 0 | 0 |
| | | 0 | 0 | 196 | 0 |
| | | 0 | 0 | 0 | 0 |
| | | 0 | 0 | 0 | 0 |
| | Average | | 0 | | 52 |
| | Std. Dev. | | | | 112 |
| 7-C | (Control) | 0 | 0 | 0 | 0 |
| | | 0 | 0 | 0 | 0 |
| | | 0 | 0 | 0 | 0 |
| | | 0 | 0 | 0 | 0 |

TABLE VI-A-continued

| SAMPLE | Counts Per 100 Seconds CENTER | | SURFACE | |
|---|---|---|---|---|
| | 0 | 0 | 0 | 0 |
| | | 0 | | 0 |
| Average Std. Dev. | | | | |

Next, the three staple samples are each spun to 27.8 Z twist 37 cc singles yarns and woven into 2×2 twill (112×78) fabrics. The greige fabrics are scoured with 1% Duponol C and 1% tetrasodium pyrophosphate at 80° C. for 20 minutes to remove slashing size, then rinsed well, dried and pressed. The fabrics are autoclaved for 30 minutes in 30 psig steam, and then are tested for % phosphorus, F.I.T., % shrinkage, and Limiting Oxygen Index (L.O.I.)

TABLE VI-B

| SAMPLE | FABRIC BASIS WT. | % P | F.I.T. | % SHRINK. | L.O.I. |
|---|---|---|---|---|---|
| 7-A (wet treated) | 4.30 oz/yd$^2$ | 1.0 | 66, >90, >90 sec. | 38% | 0.43 |
| 7-B (dry, treated) | 4.03 | 0.08 | 3.2, 3.2, 3.2 | 47% | 0.31 |
| 7-C (control) | 4.58 | 0.007 | 3.0, 3.1, 3.1 | 49% | 0.28 |

Only sample 7-A qualifies as a product of this invention: Note the phosphorus content (Table VI-B) and phosphorus distribution (Table VI-A). Note also sample 7-A's outstanding F.I.T. (as well as higher L.O.I., and somewhat reduced flame shrinkage). Furthermore, note that sample 7-B (given the identical flame-retardant application treatment, excepting only that the tow was dried first) initially picks up only about 1/5 as much phosphorus (less than the minimum 0.4% requirement of the present invention), that even this phosphorus is exclusively a surface coating (Table VI-A), and that the coating is not durable to handling (approximately half of the phosphorus is lost on converting the tow into fabric). Continued additional loss of phosphorus is to be expected if this fabric were made into a garment and worn.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A fiber comprising poly(metaphenylene isophthalamide) containing distributed substantially throughout its whole interior finely divided deposits comprised of a tetrakis hydroxymethyl phosphonium compound cross-linked to a reactive resin selected from the group of melamine formaldehyde condensates and phenol formaldehyde condensates in an amount sufficient to provide at least 0.4% by weight phosphorus, based on the total weight of fiber, the phosphonium compound and the reactive resin having been absorbed into water-swollen, never dried poly(methaphenylene isophthalamide) fibers before cross-linking.

2. The fiber of claim 1 wherein the weight of phosphorus is no more than 2.1%.

3. The fiber of claim 2 wherein the deposits are the reaction product of 2–4 parts phosphorus compound to each part resin compound and the weight of phosphorus is at least 0.7%.

4. The fiber of claim 1 wherein the deposits are the reaction product of tetrakis hydroxymethyl phosphonium compound and melamine-formaldehyde condensate.

5. A yarn of the fibers of claim 1.

6. A fabric of the yarn of claim 5.

* * * * *